US011985097B2

(12) United States Patent
Aksar et al.

(10) Patent No.: US 11,985,097 B2
(45) Date of Patent: May 14, 2024

(54) MULTI-AGENT CHATBOT WITH MULTI-INTENT RECOGNITION

(71) Applicant: INTERNATIONAL BUSINESS MACHINES CORPORATION, Armonk, NY (US)

(72) Inventors: Burak Aksar, Boston, MA (US); Yara Rizk, Cambridge, MA (US); Tathagata Chakraborti, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 17/662,484

(22) Filed: May 9, 2022

(65) Prior Publication Data

US 2023/0362107 A1 Nov. 9, 2023

(51) Int. Cl.
*H04L 51/02* (2022.01)
*G06F 40/205* (2020.01)
(Continued)

(52) U.S. Cl.
CPC ............ *H04L 51/02* (2013.01); *G06F 40/205* (2020.01); *G06F 40/30* (2020.01);
(Continued)

(58) Field of Classification Search
CPC ....... H04L 51/02; G06F 40/205; G06F 40/30; G10L 15/1815; G10L 15/1822; G10L 15/22
See application file for complete search history.

(56) References Cited

U.S. PATENT DOCUMENTS 10,824,818 B2 11/2020 Peper
11,144,726 B2 10/2021 Chatterjee
(Continued)

FOREIGN PATENT DOCUMENTS

CN 108780537 A 11/2018
CN 113761158 A 12/2021
(Continued)

OTHER PUBLICATIONS

Rychalska, Barbara, Helena Glabska, and Anna Wroblewska. "Multi-intent hierarchical natural language understanding for chatbots." 2018 Fifth international conference on social networks analysis, management and security (SNAMS). IEEE, 2018. (Year: 2018).*

(Continued)

*Primary Examiner* — Soe Hlaing
(74) *Attorney, Agent, or Firm* — Steven M. Bouknight

(57) ABSTRACT

A method for automatically detecting and processing a computer input event comprising one or more intents is provided. The method may include, in response to receiving the computer input event, automatically generating a parse tree comprising nodes including a possible interpretation of the received computer input event and at least one determined intent. The method may further include performing a confidence evaluation for the nodes and receiving one or more first scores from one or more computer agents for a respective node to indicate an ability of a respective computer agent to process the respective node. The method may further include, determining a second score for the respective node by aggregating the one or more first scores from the one or more computer agents for the respective node. The method may further include, based on the determined second score, selecting a node for processing the received computer input event.

17 Claims, 7 Drawing Sheets

(51) Int. Cl.
  *G06F 40/30* (2020.01)
  *G10L 15/18* (2013.01)
  *G10L 15/22* (2006.01)

(52) U.S. Cl.
  CPC ...... *G10L 15/1815* (2013.01); *G10L 15/1822* (2013.01); *G10L 15/22* (2013.01)

(56) References Cited

U.S. PATENT DOCUMENTS

| | | | |
|---|---|---|---|
| 11,195,532 | B2 | 12/2021 | Teserra |
| 11,200,506 | B2 | 12/2021 | Wu |
| 11,200,886 | B2 | 12/2021 | Chatterjee |
| 11,822,888 | B2 * | 11/2023 | Beaver ............... G06F 40/274 |
| 2014/0180692 | A1 | 6/2014 | Joshi |
| 2018/0165691 | A1 | 6/2018 | Heater et al. |
| 2020/0019641 | A1 | 1/2020 | Tonetti |
| 2020/0342850 | A1 * | 10/2020 | Vishnoi ............... G06F 40/30 |
| 2020/0342874 | A1 * | 10/2020 | Teserra ............... G06F 40/35 |
| 2020/0349325 | A1 | 11/2020 | Sapugay |
| 2021/0067470 | A1 | 3/2021 | Freed et al. |
| 2021/0182340 | A1 | 6/2021 | Carrier et al. |

FOREIGN PATENT DOCUMENTS

| | | |
|---|---|---|
| WO | 2021063524 A1 | 4/2021 |
| WO | 2023216857 A1 | 11/2023 |

OTHER PUBLICATIONS

Rizk, Yara, et al. "A unified conversational assistant framework for business process automation." arXiv preprint arXiv:2001.03543 (2020). (Year: 2020).*

Kim, et al., "Two-stage Multi-Intent Detection for Spoken Language Understanding," Multimed Tools Appl (2017) 76: 11377-11390, Springer Science+Business Media New York 2016, 14 pgs.

Qin, et al., "AGIF: An Adaptive Graph-Interactive Framework for Joint Multiple Intent Detection and Slot Filling," arXiv:2004.10087v4 [cs.CL], Oct. 17, 2020, 10 pgs, <https://arxiv.org/abs/2004.10087>.

Mell et al., "The NIST Definition of Cloud Computing", Recommendations of the National Institute of Standards and Technology, NIST Special Publication 800-145, Sep. 2011, 7 pages.

International Search Report and Written Opinion for International Application No. PCT/CN2023/090201, International Filing Date: Apr. 24, 2023, dated Jun. 23, 2023, 8 pages.

Rizk et al., "A Unified Conversational Assistant Framework for Business Process Automation", arXiv:2001.03543v1, Jan. 7, 2020, 9 pages.

* cited by examiner

MULTI-AGENT CHATBOT WITH MULTI-INTENT RECOGNITION

BACKGROUND

The present invention relates generally to the field of computing, and more specifically, to detecting and processing multi-intent queries.

Generally, a chatbot is software that simulates human-like conversations with users. More specifically, a chatbot may be a software application used to conduct an on-line chat conversation via text or text-to-speech in lieu of providing direct contact with a live human agent. Currently, chatbots have evolved from simple question answering customer support bots to fully autonomous virtual assistants utilizing artificial intelligence. Furthermore, chatbots can be used in dialog systems for various purposes including customer service, request routing, or information gathering. While some chatbot applications use extensive word-classification processes, natural language processors, and sophisticated AI, others simply scan for general keywords and generate responses using common phrases obtained from an associated library or database. As chatbots are designed to convincingly simulate the way a human would behave or respond as a conversational partner, chatbot systems typically require continuous tuning and testing, and many in production remain unable to adequately converse.

SUMMARY

A method for automatically detecting and processing a computer input event comprising one or more intents is provided. The method may include, in response to receiving the computer input event, automatically generating a parse tree comprising one or more nodes with the one or more nodes including a possible interpretation of the received computer input event, and wherein the possible interpretation includes at least one determined intent. The method may further include performing a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent. The method may further include based on the confidence evaluation for the one or more nodes, determining a second score for the respective node associated with the one or more nodes based on the at least one determined intent and the one or more computer agents, wherein determining the second score comprises aggregating the one or more first scores from the one or more computer agents for the respective node. The method may further include based on the determined second score, selecting a node associated with the one or more nodes and one or more corresponding computer agents for the selected node for processing the received computer input event.

A computer system for automatically detecting and processing a computer input event comprising one or more intents is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to receiving the computer input event, automatically generating a parse tree comprising one or more nodes with the one or more nodes including a possible interpretation of the received computer input event, and wherein the possible interpretation includes at least one determined intent. The method may further include performing a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent. The method may further include based on the confidence evaluation for the one or more nodes, determining a second score for the respective node associated with the one or more nodes based on the at least one determined intent and the one or more computer agents, wherein determining the second score comprises aggregating the one or more first scores from the one or more computer agents for the respective node. The method may further include based on the determined second score, selecting a node associated with the one or more nodes and one or more corresponding computer agents for the selected node for processing the received computer input event.

A computer program product for automatically detecting and processing a computer input event comprising one or more intents is provided. The computer program product may include one or more computer-readable storage devices and program instructions stored on at least one of the one or more tangible storage devices, the program instructions executable by a processor. The computer program product may include program instructions to, in response to receiving the computer input event, automatically generate a parse tree comprising one or more nodes with the one or more nodes including a possible interpretation of the received computer input event, and wherein the possible interpretation includes at least one determined intent. The computer program product may further include program instructions to perform a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent. The computer program product may also include program instructions to, based on the confidence evaluation for the one or more nodes, determine a second score for the respective node associated with the one or more nodes based on the at least one determined intent and the one or more computer agents, wherein determining the second score comprises aggregating the one or more first scores from the one or more computer agents for the respective node. The computer program product may include program instructions to, based on the determined second score, select a node associated with the one or more nodes and one or more corresponding computer agents for the selected node for processing the received computer input event.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
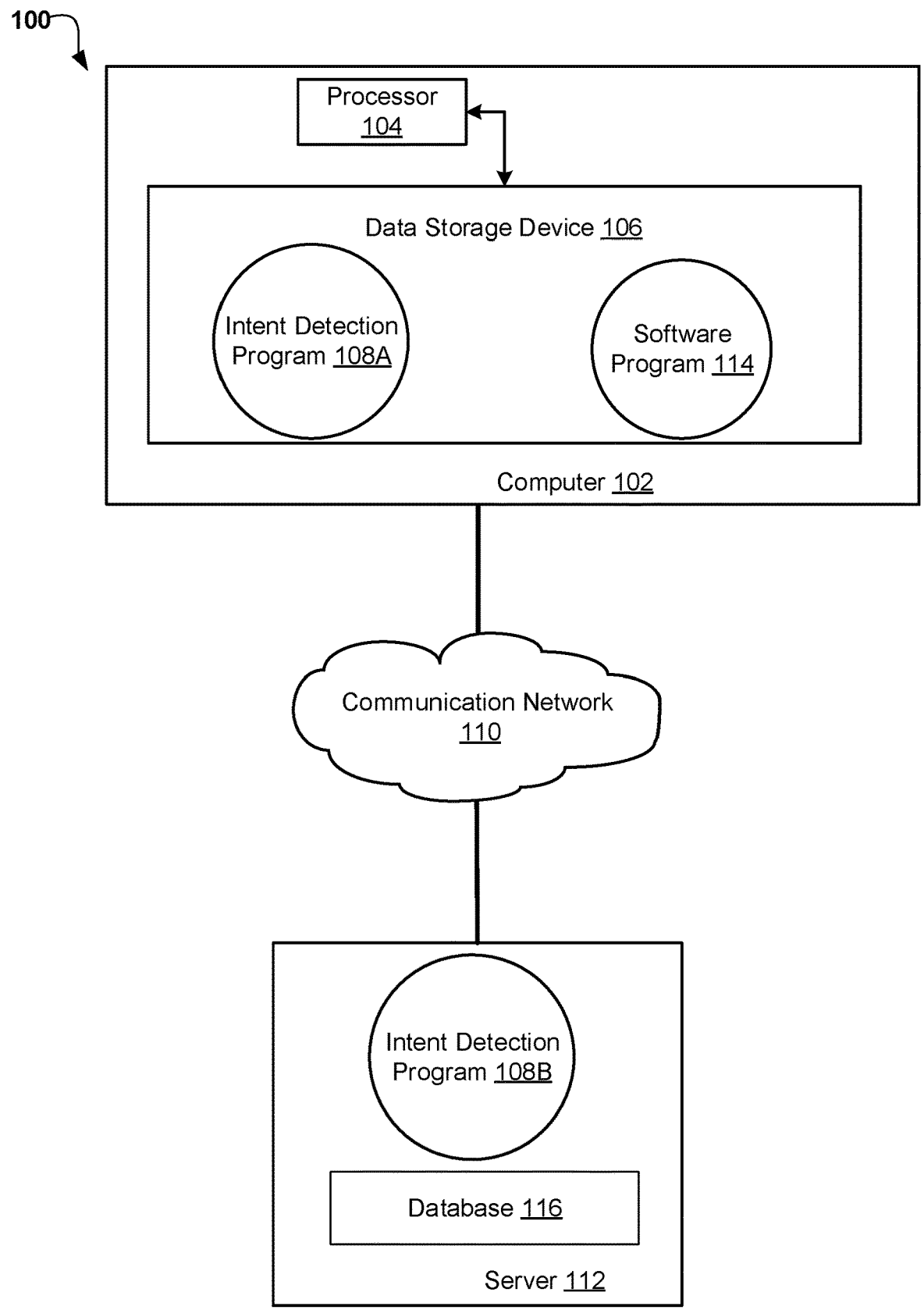
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically detecting and processing a computer input event comprising one or more intents. Specifically, the following described exemplary embodiments provide a system, method and program product for detecting multi-intent computer input events from user voice input and/or keyboard input via a computing device. Therefore, the exemplary embodiments have the capacity to improve the technical field associated with natural language understanding in association with computer communication interfaces such as question and answering systems and chatbots by using natural language processing (NLP) techniques to identify multiple intents in a computer input event. More specifically, in response to receiving the computer input event, the present invention may automatically generate a parse tree comprising one or more nodes with the one or more nodes including a possible interpretation of the received computer input event, and wherein the possible interpretation includes at least one determined intent. Furthermore, the method, computer system, and computer program product described herein may perform a confidence evaluation for the one or more nodes based on the at least one determined intent and based one or more computer agents, wherein performing the confidence evaluation further includes receiving one or more first scores, determine a second score for respective nodes associated with the one or more nodes by aggregating the one or more first scores from the one or more computer agents for the respective nodes, and select a node for processing the received computer input event based on the determined second scores.

More specifically, and as previously described with respect to chatbots, a chatbot may be a software application used to conduct an on-line chat conversation via text or text-to-speech in lieu of providing direct contact with a live human agent. However, and as previously described, as chatbots are designed to convincingly simulate the way a human would behave or respond as a conversational partner, chatbot systems typically require continuous tuning and testing, and many in production remain unable to adequately converse. For example, chatbots tend to struggle with a multi-intent input query that may invoke multiple agents for answering or responding to the multi-intent input query. More specifically, for example, a multi-intent input query may include an inputted utterance or text whereby the inputted utterance or text further includes more than one intent that invokes more than one different agent (such as more than one application programming interface (API) call, website, app, services databases, etc.) for processing and responding to the multi-intent input query.

A more specific example of a multi-intent input query includes the inputted sentence or utterance—"Can you list the available flights to Boston and provide meal cost options?"— whereby this multi-intent input query includes a flight-list intent and a meal-list intent. As such, multiple agents need to be invoked to respond to the query, whereby invoking the multiple agents may include initiating an API call to a website to specifically identify Boston flights and initiating a different API call to another website to specifically identify meal cost options for the specific flights. However, existing single-intent natural language understanding (NLU) chatbots may only recognize a single intent in the inputted query. Specifically, for the multi-intent inputted query—"Can you list the available flights to Boston and provide meal cost options?— a single-intent NLU chatbot may interpret the entire sentence as just one intent and invoke an agent for responding to the entire query, such as by initiating an API call to the website that is only able to identify Boston flight times. Therefore, in response to receiving the multi-intent inputted query, the agent that is only able to lists the Boston flight times may exhibit low confidence for responding to the entire inputted query (i.e. collectively to both intents—the flight-list intent and meal-list intent) simply because that agent is not able to provide an adequate or proper response to the meal-list intent. Accordingly, as a multi-intent query may include a complex sentence having multiple intents or things that may not be relevant to a certain agent, that certain agent may provide a lower confidence score on how well the agent can handle (or respond to) the multi-intent query.

Therefore, it may be advantageous, among other things, to provide a method, computer system, and computer program product for automatically detecting and processing a computer input event comprising one or more intents. Specifically, the method, computer system, and computer program product may, in response to receiving the computer input event, automatically generate a parse tree comprising one or more nodes with the one or more nodes including a possible interpretation of the received computer input event, and wherein the possible interpretation includes at least one determined intent. Furthermore, the method, computer system, and computer program product may perform a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent. Then, the method, computer system, and computer program product may, based on the confidence evaluation for the one or more nodes, determine a second score for the respective node associated with the one or more nodes based on the at least one determined intent and the one or more computer agents, wherein determining the second score comprises aggregating the one or more first scores from the one or more computer agents for the respective node. Next, the method, computer system, and computer program product may, based on the determined second score, select a node associated with the one or more nodes and one or more corresponding computer agents for the selected node for processing the received computer input event.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run an intent detection program 108A and a software program 114, and may also include a microphone (not shown). The software program 114 may include one or multiple application programs such as an internet program and/or one or more mobile/computer apps running on a computer 102, such as a mobile phone device, desktop, and/or laptop. The intent detection program 108A may communicate with the software program 114. The networked computer environment 100 may also include a server 112 that is enabled to run an intent detection program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server computer 112 via the communications network 110. The communications network 110 may include connections, such as wire, wireless communication links, or fiber optic cables. As will be discussed with reference to FIG. 4, server computer 112 may include internal components 710a and external components 750a, respectively, and client computer 102 may include internal components 710b and external components 750b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, and internet of things (IoT) device, an augmented reality (AR) device, or any type of computing device capable of running a program and accessing a network. According to various implementations of the present embodiment, the intent detection program 108A, 108B may interact with a database 116 that may be embedded in various storage devices, such as, but not limited to, a mobile device 102, a networked server 112, or a cloud storage service.

According to the present embodiment, a program, such as an intent detection program 108A and 108B may run on the computer 102 and/or on the server computer 112 via a communications network 110. The intent detection program 108A, 108B may automatically and cognitively consolidate different electronic communications from different communication platforms/modes into one electronic communication based on a determined context and users associated with the different electronic communications. Specifically, the computer 102, such as a desktop computer, laptop computer, tablet, and/or mobile device, may run an intent detection program 108A, 108B, that may interact with a software program 114 to detect and process a computer input event comprising one or more intents. Specifically, the intent detection program 108A, 108B may, in response to receiving the computer input event, automatically generate a parse tree comprising one or more nodes with the one or more nodes including a possible interpretation of the received computer input event, and wherein the possible interpretation includes at least one determined intent. Furthermore, the intent detection program 108A, 108B may perform a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent. Then, the intent detection program 108A, 108B may, based on the confidence evaluation for the one or more nodes, determine a second score for the respective node associated with the one or more nodes based on the at least one determined intent and the one or more computer agents, wherein determining the second score comprises aggregating the one or more first scores from the one or more computer agents for the respective node. Next, the intent detection program 108A, 108B may, based on the determined second score, select a node associated with the one or more nodes and one or more corresponding computer agents for the selected node for processing the received computer input event.

Figure 2A:
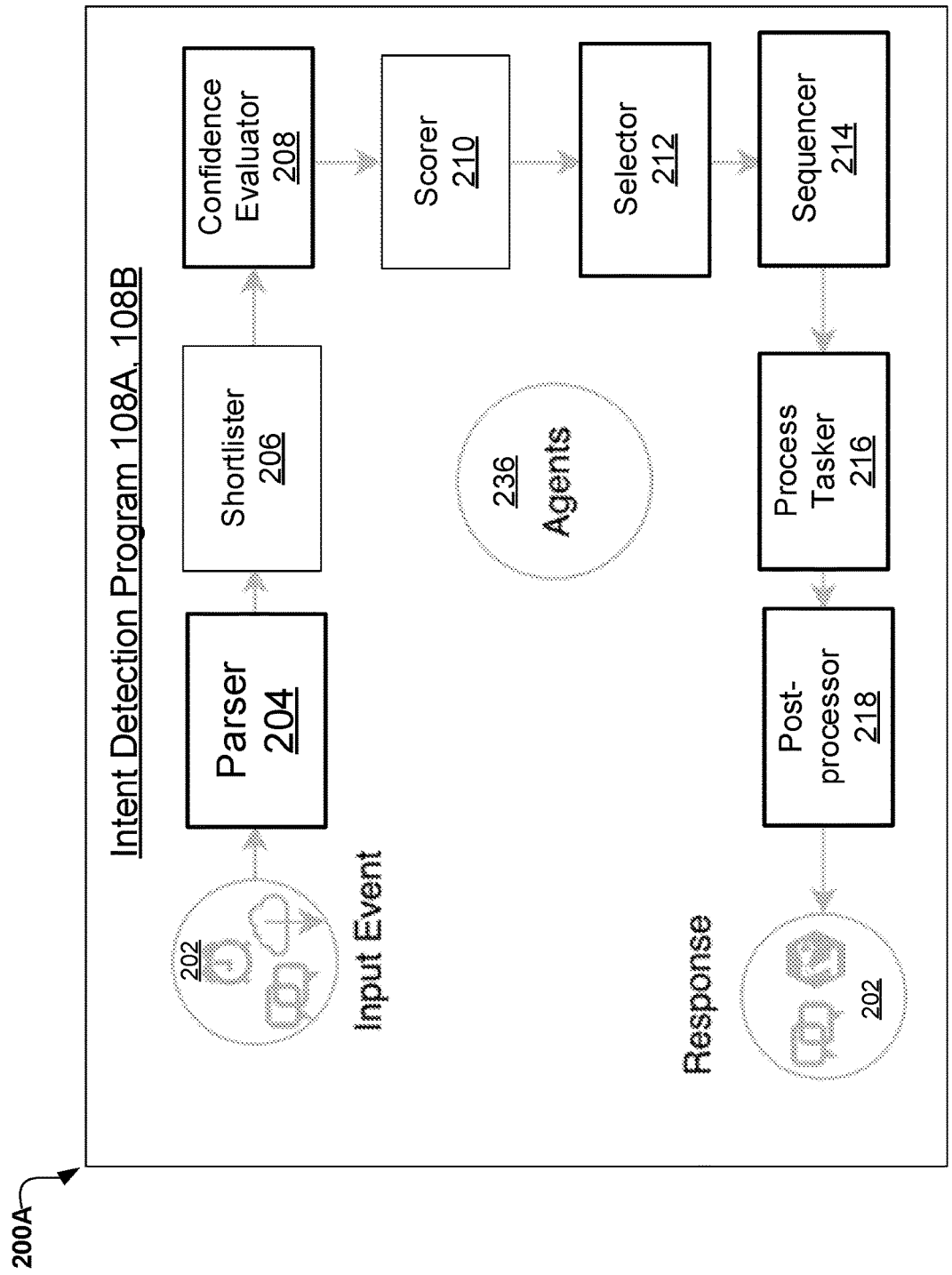
FIG. 2A an example diagram illustrating internal components of a program for automatically detecting and processing a computer input event comprising one or more intents according to one embodiment.

Referring now to FIG. 2A, an example diagram 200A illustrating internal components of the intent detection program 108A, 108B according to one embodiment is depicted. Specifically, in FIG. 2A, the intent detection program 108A, 108B may include an interface 202 for receiving a computer input event, whereby the interface may include a chatbot. According to one embodiment, the computer input event may include voice input such as an utterance from a user, keyboard input such as a typed-in statement/query from the user using a computer (such as computer 102 as previously described), and/or an input event from a computer 102 such as scheduled tasks. The intent detection program 108A, 108B may also include a parser 204. As will be further described with respect to FIG. 2B, the intent detection program 108A, 108B may use the parser 204 to automatically generate a parse tree based on the received computer input event, whereby the parse tree may include one or more nodes with each node representing a parse combination and a possible interpretation of the received computer input event. Furthermore, the intent detection program 108A, 108B may include a shortlister 206. As will be further described with respect to FIG. 2B, the intent detection program 108A, 108B may use the shortlister to identify a subset of computer agents that may be able to process and/or respond to the computer input event based on language in the computer input event.

Additionally, the intent detection program 108A, 108B may include a confidence evaluator 208. According to one embodiment, and as will be further described with respect to FIG. 2B, the intent detection program 108A, 108B may use the confidence evaluator 208 to perform a confidence evaluation of one or more nodes based on at least one determined intent associated with a respective node as well as based on one or more computer agents 236, whereby performing the confidence evaluation may further include sending/broadcasting the one or more nodes to the computer agents and receiving one or more first scores from the computer agents 236 to indicate an ability of a respective computer agent to process a node based on the at least one determined intent. Furthermore, the intent detection program 108A, 108B may include a scorer 210. According to one embodiment, the intent detection program 108A, 108B may use the scorer 210 to aggregate the scores received from the computer agents 236 for a given node to determine a final score for the given node. The intent detection program 108A, 108B may also include a selector 212. According to one embodiment, based on the determined final scores for the nodes from the scorer 210, the intent detection program 108A, 108B may use the selector 212 to select a node with a highest score (as compared to other nodes) and correspondingly select the multiple computer agents needed to process the received computer input event. Furthermore, the intent detection program 108A, 108B may include a sequencer 214. According to one embodiment, the intent detection program 108A, 108B may use the sequencer 214 to sequence the order in which to process the computer input event in response to the computer input event including multiple intents, and thereby, multiple computer agents 236 needed to process the multiple intents. Also, the intent detection program 108A, 108B may include a process tasker 216 to process the received computer event based on the selected node with the highest score and using the computer agents associated with that node as well as execute the process according the sequence from the sequencer 214. The intent detection program 108A, 108B may further include a post-processor 218 to perform any post-processing such as transforming results/output from processing the received computer input event into a format that may be easily understood by the user. Thereafter, the intent detection program 108A, 108B may again use the interface 202 to present/display a response to the user that includes results from processing the computer input event according to the method, system, and computer program product described herein.

Figure 2B:
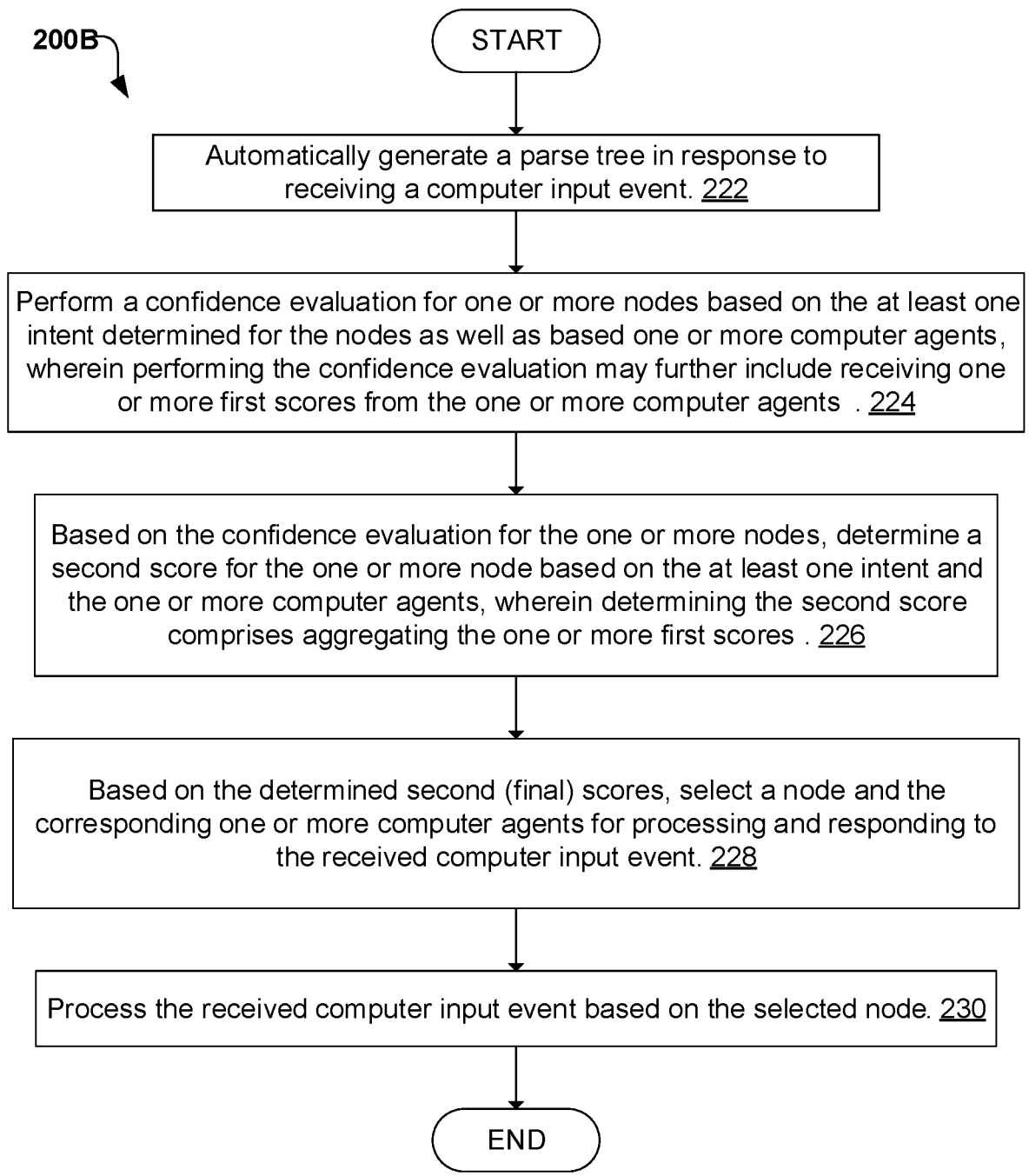
FIG. 2B is an operational flowchart illustrating the steps carried out by a program for automatically detecting and processing a computer input event comprising one or more intents according to one embodiment.

Referring now to FIG. 2B, an operational flowchart 200B further illustrating the steps carried out by the intent detection program 108A, 108B for automatically detecting and processing a computer input event comprising one or more intents is depicted. Specifically, at 222, the intent detection program 108A, 108B may, in response to receiving the computer input event, automatically generate a parse tree comprising one or more nodes with the one or more nodes including a possible interpretation of the received computer input event. More specifically, and as previously described in FIG. 2A, the intent detection program 108A, 108B may receive, via an interface 202 (FIG. 2A), a computer input event which may include a received utterance and/or typed-in statement/query. For example, a user may use a computer 102 (FIG. 1), such as a mobile device, IoT device, desktop, and/or laptop, to access an interface 202 such as a chatbot included in the intent detection program 108A, 108B, whereby the user may type or utter a statement/query such as: "Can you list the available flights to Boston and provide meal cost options?" Thereafter, and as previously described, in response to receiving the computer input event that includes the utterance or typed-in statement, the intent detection program 108A, 108B may use a parser 204 to automatically generate a parse tree.

Figure 3:
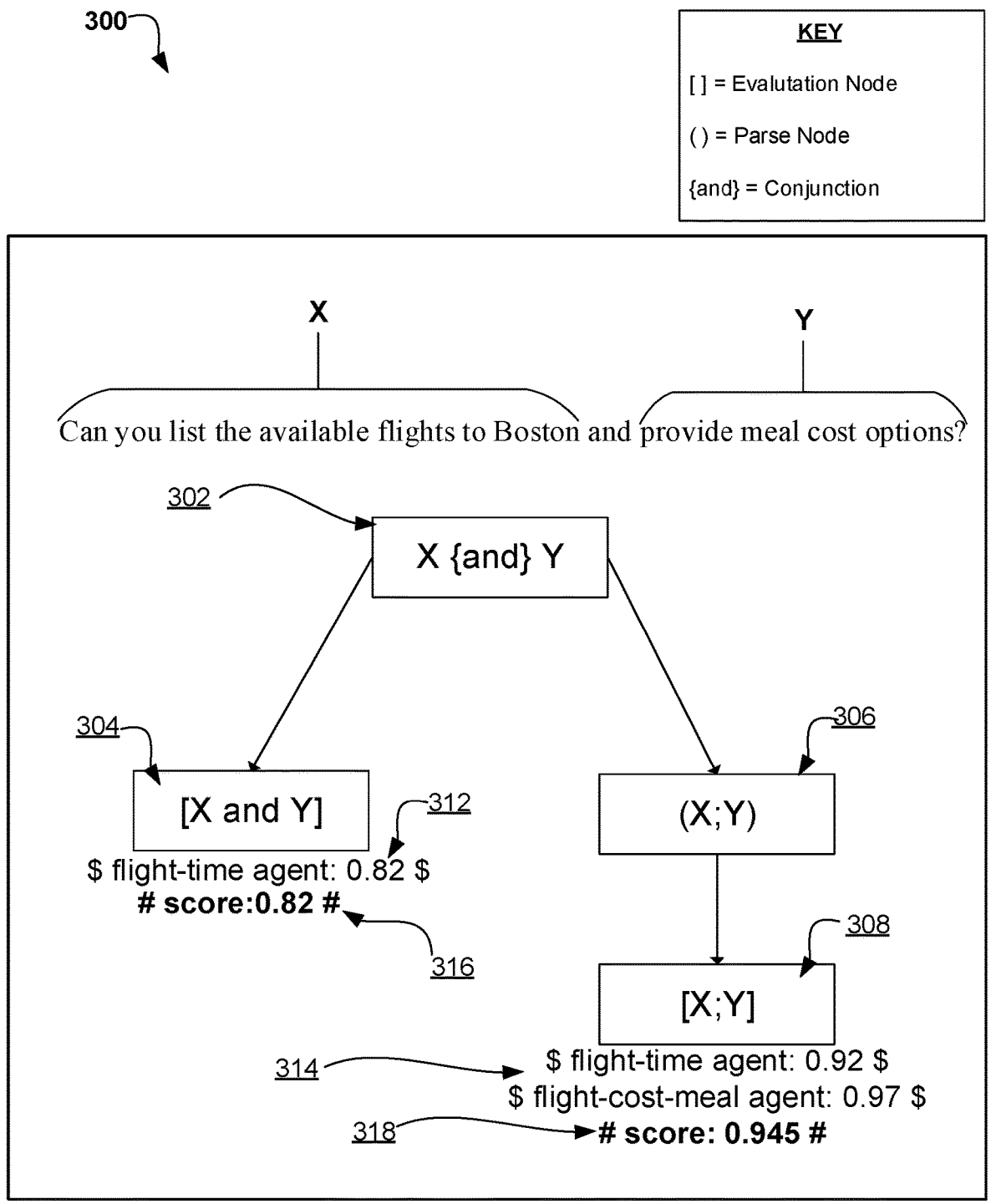
FIG. 3 is an example diagram illustrating a parse tree based on a program for automatically detecting and processing a computer input event comprising one or more intents according to one embodiment.

An example of a parse tree 300 is depicted in FIG. 3. According to one embodiment, the intent detection program 108A, 108B may generate a parse tree 300 by taking the received computer input event, such as the uttered or typed-in statement/query, and using a parser 204 (FIG. 2A) that may further include natural language processing (NLP) techniques to identify different parts of speech and punctuation in the statement/query as well as possible interpretations of the statement/query. For example, a parser 204 may be a compiler or interpreter component that breaks data into smaller elements for easy translation into another language. Therefore, a parser 204 may commonly be used to organize text in a structure that can be easily manipulated (such as a parse tree 300). To do so, the parser 204 typically follows a set of defined rules according to grammar. Therefore, in response to receiving the computer input event (i.e. an uttered or typed-in statement/query), the intent detection program 108A, 108B may use the parser 204 to perform NLP techniques such as lexical analysis, syntactic analysis, semantic analysis, and intent classification to identify the language, punctuation, and specific parts of speech to further breakdown the statement/query into one or more parts. As such, the intent detection program 108A, 108B may use the parser to identify the different parts of the statement/query as well as to determine whether the combination of the different parts represent a single intent or multiple intents.

For example, and referring to FIG. 3, the intent detection program 108A, 108B may use the parser 204 (FIG. 2A) to identify one or more parts of the statement/query by identifying punctuation and/or parts of speech (such as conjunctions "and", "or", "but", "because", etc.) within the statement/query which may further indicate an existence of more than one part in the statement/query. More specifically, for example, and for the received statement/query—"Can you list the available flights to Boston and provide meal cost options?"— the intent detection program 108A, 108B may use the parser 204 to identify the conjunction, "and", within the statement/query. Accordingly, based on the conjunction "and" in the statement/query, the intent detection program 108A, 108B may determine that the statement/query may include more than one part.

Accordingly, the intent detection program 108A, 108B may generate a parse tree 300 for the specific statement/query—"Can you list the available flights to Boston and provide meal cost options?"— by parsing the statement/query using the parser 204, as indicated by the parentheses in FIG. 3. Specifically, the intent detection program 108A, 108B may generate a parse tree 300 with each node representing all possible parse combinations and/or interpretations of the given utterance or typed-in statement/query. Therefore, based on the previously described detection of the conjunction "and" in the aforementioned statement/query—"Can you list the available flights to Boston and provide meal cost options?"— the intent detection program 108A, 108B may first detect that the statement may be a combination of 2 parts as depicted at node 302. Specifically, the intent detection program 108A, 108B may detect that the language preceding "and"—i.e. "Can you list the available flights to Boston"—may represent one part of the statement/query as depicted by "X" in FIG. 3. Furthermore, the intent detection program 108A, 108B may detect that the language following "and"—i.e. "provide meal cost options"—may represent another part of the statement/query as depicted by "Y" in FIG. 3.

As previously described, the intent detection program 108A, 108B may further parse the statement/query to generate a parse tree 300 with nodes representing all possible parse combinations and/or interpretations of the different parts (i.e. "X" and "Y") for the given utterance or typed-in statement/query. More specifically, and as depicted by the node 304, the intent detection program 108A, 108B may use the parser 204 to determine that a possible interpretation of the statement/query is that the word "and" may connect 2 parts within the statement, however, that together the 2 parts represent a single intent that can be handled/processed by a single computer agent (and/or processed by performing a single API call to a computer agent). Specifically, the intent detection program 108A, 108B may determine that, although the word "and" exist in the statement/query (indicating an existence of 2 parts or intents), the statement/query—"Can you list the available flights to Boston and provide meal cost options?"— simply represents one intent which may be resolved be sending the full statement/query (i.e. both parts, "X" and "Y", as a whole to represent a single intent) to a respective computer agent. Another example of a single intent query may include the statement/query—"list all of the borrowers with income greater than $50k and zip codes in Massachusetts." While the conjunction "and" may exist in the statement/query, the statement/query may still be handled by a single computer agent and/or by sending the full statement/query to the computer agent, such as by performing an API call to a website or querying a database that may include a list of borrowers and information associated with each borrower (including location information). Therefore, the statement/query may be a single intent query that is capable of being processed by a single computer agent such as a website or database that is capable of processing the full statement/query despite the existence of an indication that the statement/query includes 2 parts based on the conjunction "and." Thus, going back to the previous example, the intent detection program 108A, 108B may represent the statement/query—"Can you list the available flights to Boston and provide meal cost options?"— as a single intent by the notation "X and Y" in the node 304.

Alternatively, and as represented by the node 306 in FIG. 3, the intent detection program 108A, 108B may use the parser 204 to determine that another interpretation of the statement/query is that the word "and" may connect the 2 parts within the statement/query whereby instead each part represents an intent (and consequently, the statement/query includes more than one intent) such that the statement/query may require multiple computer agents to process the statement/query. Specifically, and as previously described, the intent detection program 108A, 108B may detect that the language preceding "and"—i.e. "Can you list the available flights to Boston"—may represent one part of the statement/query, as depicted by "X" in FIG. 3, as well as may represent one intent. Furthermore, the intent detection program 108A, 108B may detect that the language following "and"—i.e. "provide meal cost options"—may represent another part of the statement/query, as depicted by "Y" in FIG. 3, as well as may represent a second intent that may be based on the first intent X. Specifically, the intent detection program 108A, 108B may determine a first intent (X) to list all available flight options to Boston, and a second intent (Y) that based on the list of available flight also list meal cost options for those flight. Accordingly, the intent detection program 108A, 108B may represent the statement/query—"Can you list the available flights to Boston and provide meal cost options?"— as having 2 intents by the notation "X;Y" in the node 306, which may represent the interpretation that given a list of available flights to Boston also list meal cost options for the flight.

The intent detection program 108A, 108B may further determine whether each node 304 and 306 can be further parsed. Specifically, according to one embodiment, in response to the intent detection program 108A, 108B determining that the node 304 includes one possible interpretation that the 2 parts of the statement/query represents a single intent and that only one conjunction exists, the intent detection program 108A, 108B may determine that the node 304 cannot be further parsed. As such, the intent detection program 108A, 108B may determine that node 304 represents one final interpretation of the statement/query. Alternatively, in response to the intent detection program 108A, 108B determining that the node 306 includes another possible interpretation that identifies the 2 parts of the statement/query as each representing an intent (i.e. 2 parts having 2 different but connecting intents), the intent detection program 108A, 108B may determine whether each part of the 2 parts can be further parsed as represented by the parentheses in FIG. 3. According to one embodiment, further parsing the node 306 may include determining whether each of the 2 parts of the statement/query further includes a conjunction or other punctuation indicating other parts and multiple intents by again performing the NLP techniques associated with the parser on each part as previously described. As represented by the node 308, despite further attempting to parse the node 306, and more specifically, parse each part of the statement/query, the intent detection program 108A, 108B may determine that each of the parts "X" and "Y" cannot be further parsed. Therefore, a second final interpretation of the statement/query may be represented by the node 308 as indicated again by the notation X;Y. Thereafter, once the intent detection program 108A, 108B determines that no further parsing can be performed, the intent detection program 108A, 108B may proceed to evaluating each node, as indicated by the brackets (i.e. [ ]) in nodes 304 and 308, and as will be described with respect to step 224 in FIG. 2B.

Specifically, at step 224 in FIG. 2B, and as previously described, the intent detection program 108A, 108B may perform a confidence evaluation for one or more nodes based on the at least one intent determined for the nodes as well as based one or more computer agents, wherein performing the confidence evaluation may further include receiving one or more first scores from the one or more computer agents to indicate an ability of a respective computer agent to process a node based on the at least one intent. More specifically, and as previously described, the intent detection program 108A, 108B may include an interface 202 such as a chatbot, whereby the chatbot may be used to receive the computer input event (i.e. the inputted utterance and/or statement/query) and return an answer using an agent such as a website, database, app or other program. As such, the chatbot may include or be associated with a number of agents 236 (FIG. 2A) for responding to a computer input event. Accordingly, and as previously determined at step 222, the intent detection program 108A, 108B may identify 2 final interpretations of the computer input event that includes the uttered or typed-in statement/query—"Can you list the available flights to Boston and provide meal cost options?"— as represented by the nodes 304 and 308 in FIG. 3. In turn, to perform a confidence evaluation of each node, and more specifically, the nodes 304 and 308 that include a final interpretation of the computer input event, the intent detection program 108A, 108B may send/broadcast each node 304 and 308 to the one or more computer agents and request an evaluation from the one or more computer agents to receive a confidence score from the one more computer agents. According to one embodiment, the received confidence scores from the one or more computer agents 236 may indicate an ability of a respective computer agent to process and/or respond to the computer input event based on the intent of the nodes.

According to one embodiment, and as previously described in FIG. 2A, the intent detection program 108A, 108B may first use a shortlister 206 to narrow an amount of computer agents 236 that the nodes 304 and 308 may be sent/broadcasted. More specifically, the shortlister 206 may include a combination of NLP techniques and an intent classifier to preemptively determine a subset of computer agents 236 that may be able to process and/or respond to the computer input event based on language in the computer input event. For example, based on terms such as "flights", "Boston", "meal", and "cost," in the example statement/query, the shortlister 206 may use NLP techniques and an intent classifier to determine that the computer input event is related to travel and that computer agents related to travel may be optimal for sending/broadcasting the nodes 304 and 308. Accordingly, the intent detection program 108A, 108B may use the shortlister 206 to identify a subset of computer agents 236 to send/broadcast the nodes 304 and 308 for a confidence evaluation.

As previously described with respect to performing the confidence evaluation for each node 304 and 308, the intent detection program 108A, 108B may receive a score from the computer agents 236 corresponding to a node to indicate an ability of a respective computer agent to process and/or respond to the computer input event. More specifically, each computer agent 236 may typically include NLP techniques (as previously described) as well as an intent classifier to identify language in the computer input event and identify the determined intent based on the parser from step 202, and in turn, provide a score indicating a confidence level from the computer agent to answer or respond to the computer input event. An example of provided scores are represented in FIG. 3 at 312 and 314. More specifically, for example, the intent detection program 108A, 108B may send/broadcast the node 304 which may be received by a computer agent, such as a website for Expedia® (Expedia and all Expedia-based trademarks and logos are trademarks or registered trademarks of Expedia Group, Inc. and/or its affiliates), as represented by "flight-time agent" in FIG. 3 which may be able to list flight times and cost. As previously described at step 202, node 304 includes a final interpretation of the statement/query—"Can you list the available flights to Boston and provide meal cost options?"— that represents the statement/query as a single intent. More specifically, and as previously described, the intent detection program 108A, 108B may use the parser to determine that a possible interpretation is that the word "and" may connect 2 parts within the statement, however, that together the 2 parts represent a single intent that can be handled/processed as a whole. Thus, based on the detected intent of the node 304, the Expedia® website (flight-time agent) may provide a confidence score for evaluating the entire statement/query that includes both parts X and Y, and that score may be represented as 0.80 on a scale of 0 to 1.00 (as depicted at 312 in FIG. 3).

However, and as previously described, existing single-intent natural language understanding (NLU) chatbots may only recognize a single intent in computer input events, and such a situation is represented by the final possible interpretation of the statement/query in the node 304. Thus, for the statement/query—"Can you list the available flights to Boston and provide meal cost options?— a single-intent NLU chatbot may interpret the entire sentence as just one intent and invoke an agent for responding to the entire query, such as by initiating an API call to the Expedia® app/website that may only be able to identify Boston flight times. Therefore, in response to receiving the statement/query as a single intent (and therefore, evaluate the statement/query in its entirety), the Expedia® agent which is only able to lists the Boston flight times/cost may provide a low confidence score for responding to the entire inputted statement/query (i.e. collectively to both intents—the flight-list intent and meal-list intent) simply because that agent is not able to provide an adequate or proper response to the meal-list intent. Accordingly, as a multi-intent query may include a complex sentence having multiple intents or things that may not be relevant to a certain agent, that certain agent may provide a lower confidence score on how well the agent can handle (or respond to) the multi-intent query.

On the contrary, and as previously described, the present invention may provide more than one interpretation of the computer input event based on a number of intents. Specifically, and as previously described at step 222, the intent detection program 108A, 108B may use the parser to determine that another interpretation of the statement/query is that the word "and" may connect 2 parts within the statement/query whereby instead each part represents its own but connecting intent (i.e. the statement/query includes more than one intent) such that the statement/query may require multiple computer agents to process the statement/query. Specifically, and as previously described, the intent detection program 108A, 108B may detect that the language preceding "and"—i.e. "Can you list the available flights to Boston"—may represent one part of the statement/query, as depicted by "X" in FIG. 3, as well as may represent one intent. Furthermore, the intent detection program 108A, 108B may detect that the language following "and"—i.e. "provide meal cost options"—may represent another part of the statement/query, as depicted by "Y" in FIG. 3, as well as may represent a second intent. Specifically, the intent detection program 108A, 108B may determine a first intent "X" to list all available flight options to Boston, and a second intent "Y" that says based on the list of available flight also list meal cost options for those flight.

Accordingly, when performing the confidence evaluation for node 308, the intent detection program 108A, 108B may send/broadcast the node 308 to the different agents but may represent the statement/query as having 2 parts with each part having an individual intent. Therefore, in response to sending/broadcasting the node 308 to the computer agents, a computer agent that receives the broadcasted node 308 may identify an intent and individually provide a confidence score to a part of the statement/query based on the individual intent of the part. As such, a website such as Expedia® may provide a higher confidence score, such as 0.92 (as depicted in FIG. 3 at 314 by "flight-time agent") to the part "X"— i.e. "Can you list the available flights to Boston"—for node 308 as opposed to the score the computer agent provided to both "X and Y" in node 304 since, as previously described, "Y" may not be relevant to that computer agent. Additionally, in response to sending/broadcasting the node 308 to the computer agents, a specific computer agent, such as a website specifically dedicated to a certain airline and able to list specific flight information such as meal options and cost, may be able to better provide meal cost options for the specific flights that may be listed (i.e. "Y"). Accordingly, the computer agent that includes the website for a specific airline may also provide a high score of 0.97, as represented by "flight-cost-meal agent," based on the ability of the website to identify specific flights as well as meal cost options for the specific flights. As such, the node 304 that includes the interpretation of the computer input event as a single intent may receive lower scores from computer agents as compared to the node 308 that represents the computer input event as having multiple intents.

Next, at 226 in FIG. 2B, based on the confidence evaluation for the one or more nodes, the intent detection program 108A, 108B may determine a second score for the one or more nodes based on the at least one intent and the one or more computer agents, wherein determining the second score comprises aggregating the one or more first scores from the one or more computer agents for a respective node. Specifically, and as previously described at step 224, the intent detection program 108A, 108B may perform a confidence evaluation for the nodes 304 and 309 based on the at least one intent determined for the nodes as well as based one or more computer agents, wherein performing the confidence evaluation may further include receiving one or more first scores 312 and 314 from the one or more computer agents to indicate an ability of a respective computer agent to process a node based on the at least one intent. Thereafter, for each node 304 and 306, the intent detection program 108A, 108B may use the scorer 210 (FIG. 2A) to aggregate the scores 312 and 314, respectively, to determine a final score. According to one embodiment, aggregating the scores for a respective node may, for example, include calculating a minimum, maximum, or average value for the combined scores 312 and 314 of a given node. For example, FIG. 3 depicts aggregated scores for nodes 304 and 306 at 316 and 318, respectively, by taking an average value of the combined scores for each node. More specifically, for example, and for the node 304, the Expedia® website (flight-time agent) may return a score of 0.82 that indicates an ability of the website to resolve "[X and Y]" as previously described. Other scores from other computer agents may be received for the node 304, however, for simplicity only one score is depicted. Accordingly, the intent detection program 108A, 108B may take an average value of 0.82 which equals 0.82 as depicted at 316. Also, for example, and for the node 308, the Expedia® website (flight-time agent) may return a score of 0.92 and a website for a specific airline (flight-cost-meal agent) may return a score of 0.97 to indicate an ability of the websites to resolve "[X;Y]" as previously described, whereby 0.92 may be based on "X" and 0.97 may be based on "Y". Accordingly, the intent detection program 108A, 108B may take an average value of 0.92 and 0.97 which equals 0.945 as depicted at 318.

Then, at 228 in FIG. 2B, based on the determined second (final) scores, the intent detection program 108A, 108B may select a node and the corresponding one or more computer agents for processing and responding to the received computer input event. Specifically, according to one embodiment, based on the aggregated scores 316 and 318 determined at step 210, the intent detection program 108A, 108B may use the selector 212 (FIG. 2A) to select a node with a highest score, as compared to other nodes, and select the corresponding multiple computer agents needed to process the computer input event. Therefore, according to the determined final scores 316 and 318 for each node 304 and 308, respectively, that includes a final interpretation of the computer input event as depicted in FIG. 3, the intent detection program 108A, 108B may select node 308 as the optimal way to process the computer input event, whereby the intent detection program 108A, 108B may proceed to process the computer input event according to the interpretation that the computer input event includes 2 intents.

Next, at 230 in FIG. 2B, the intent detection program 108A, 108B may process the received computer input event based on the selected node and the corresponding one or more computer agents. As previously depicted in FIG. 2A, when proceeding to process the computer input event at process tasker 216 (FIG. 2A) based on the selected node 308 and the corresponding computer agents with the highest score, the intent detection program 108A, 108B may also include a sequencer 214 (FIG. 2A) to determine a sequence or order of the computer agents to process the computer input event. For example, based on the language in the computer input event and the number of determined intents according to node 308, the intent detection program 108A, 108B may use the sequencer 214 (FIG. 2A) to determine that part "X" of the computer input event should be processed first to receive a list of available flights to Boston, and then part "Y" should be processed second to receive meal options associated with such flights. According to one embodiment, the sequencer 214 (FIG. 2A) may further include NLP techniques and machine learning to identify the sequence of computer agents for processing the computer input event. For example, using the sequencer 214 (FIG. 2A), the intent detection program 108A, 108B, may determine to first identify the available flights using the flight-time agent for processing "X" (i.e. "Can you list the available flights to Boston"). Then, based on the results from the flight-time agent for processing "X", the intent detection program 108A, 108B may use the flight-cost-meal agent to determine the meal options for such flights.

As previously described with respect to FIG. 2A, the intent detection program 108A, 108B may include a process tasker 216 (FIG. 2A) to process the received computer event based on the selected node with the highest score using the computer agents associated with that node as well as to execute the process according the sequence from the sequencer 214 (FIG. 2A). The intent detection program 108A, 108B may further include a post-processor 218 (FIG. 2A) to perform any post-processing such as transforming results/output from processing the received computer input event into a format that may be easily understood by the user. Thereafter, the intent detection program 108A, 108B may again use the interface 202 (FIG. 2A) to present/display a response to the user that includes results from processing the computer input event according to the method, system, and computer program product described herein It may be appreciated that FIGS. 1-3 provide only illustrations of one implementation and does not imply any limitations with regard to how different embodiments may be implemented. Many modifications to the depicted environments may be made based on design and implementation requirements. For example, when automatically generating a parse tree comprising one or more nodes including possible interpretations of the received computer input event, the intent detection program 108A, 108B may use the parser 204 to identify more parts of a statement/query by identifying a number of different conjunctions and/or punctuation within the statement/query which may further indicate an existence of more than two parts in a statement/query, and thereby, more nodes.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
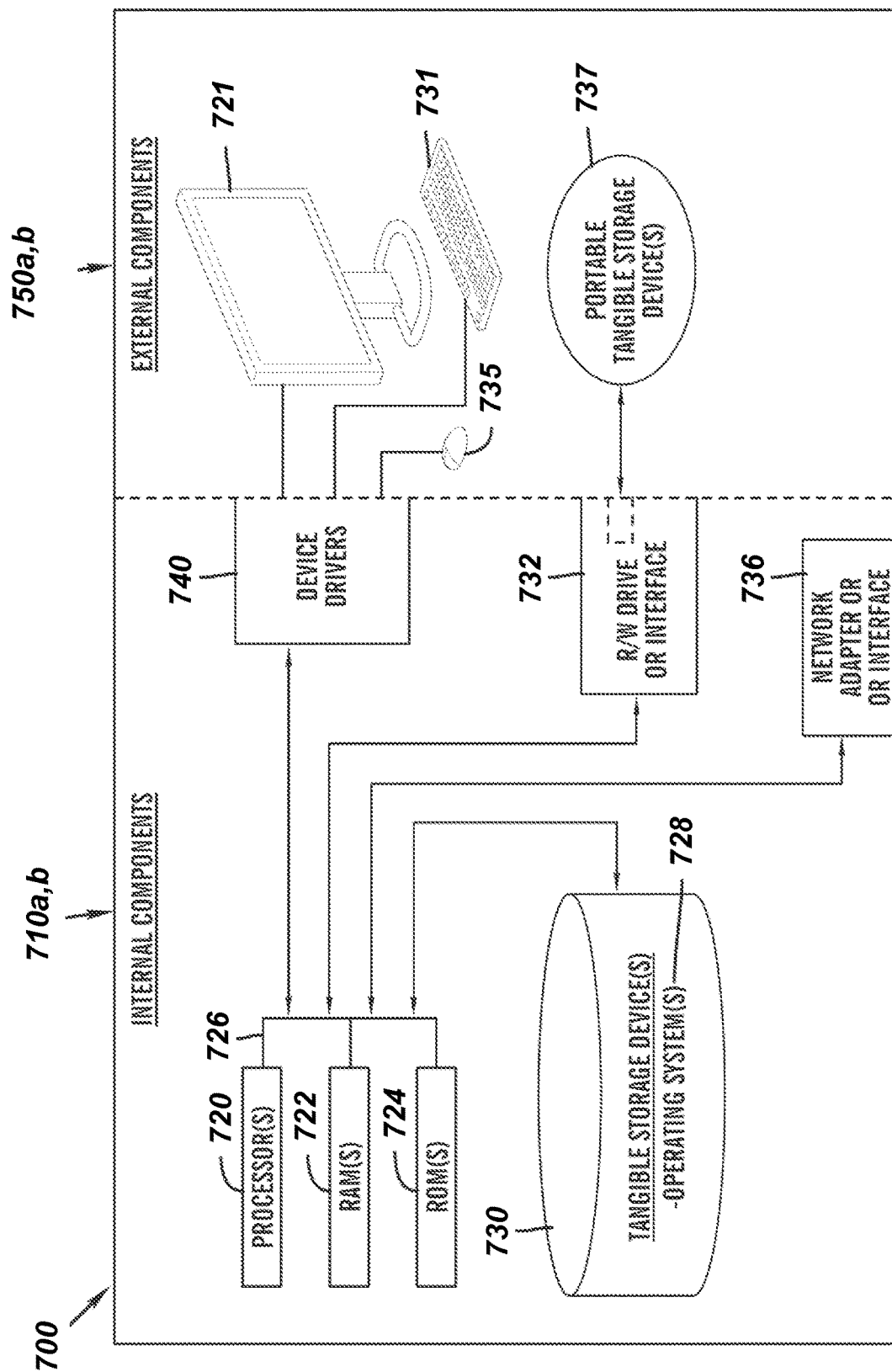
FIG. 4 is a block diagram of the system architecture of the program for automatically detecting and processing a computer input event comprising one or more intents according to one embodiment.
Figure 6:
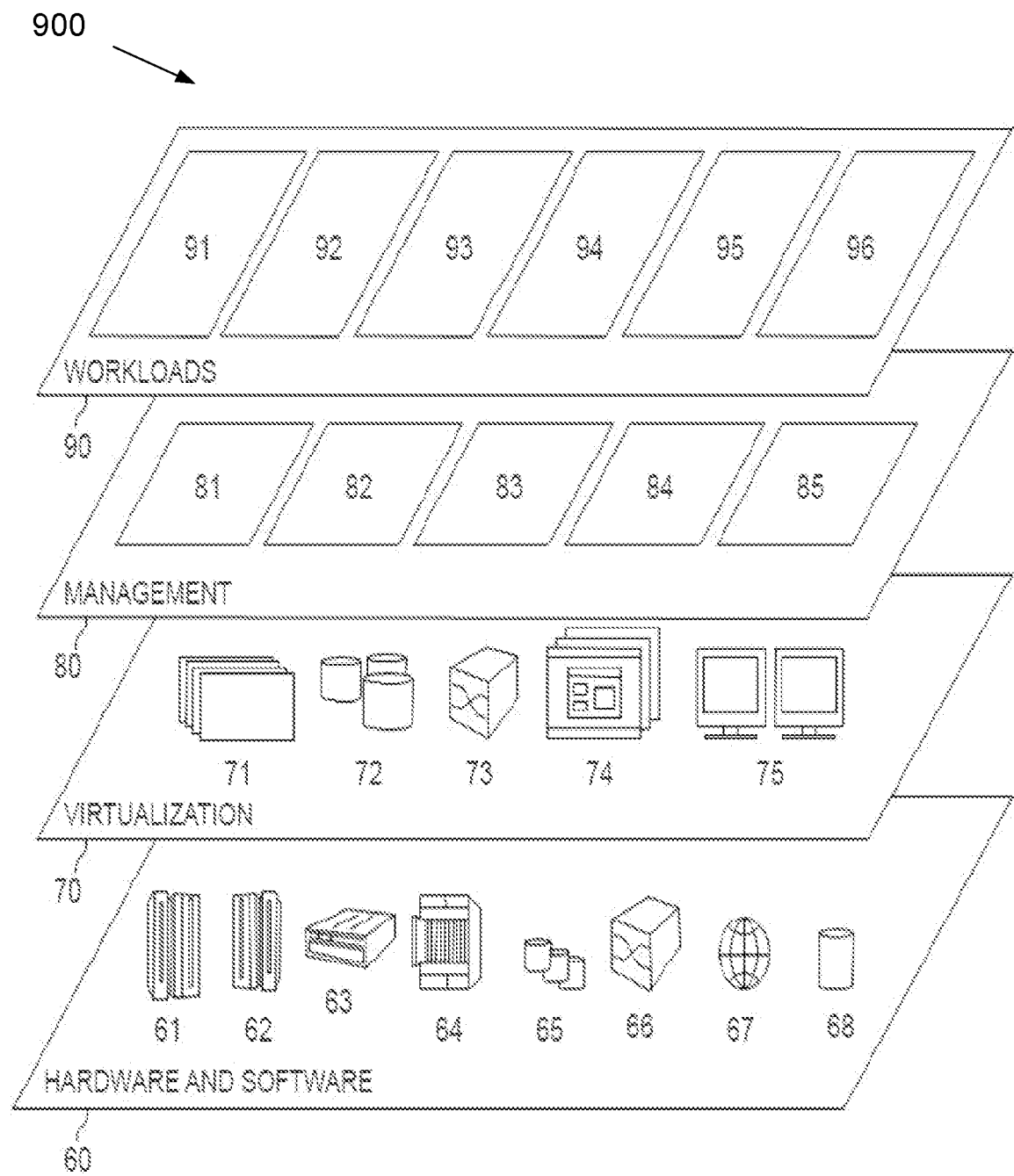
FIG. 6 is a block diagram of functional layers of the illustrative cloud computing environment of FIG. 5, in accordance with an embodiment of the present disclosure.

FIG. 4 is a block diagram 700 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 710 a, b and 750 a, b is representative of any electronic device capable of executing machine-readable program instructions that may include a computer 102 (710a and 750a) and/or a server 112 (710b and 750b). Data processing system 710 a, b and 750 a, b may be representative of a smart phone, a computer system, PDA, or other electronic devices. Examples of computing systems, environments, and/or configurations that may represented by data processing system 710 a, b and 750 a, b may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 6. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the Intent detection program 108A (FIG. 1) in client computer 102 (FIG. 1), and the Intent detection program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 6, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a RAY drive or interface 732 to read from and write to one or more portable computer-readable tangible storage devices 737 such as a CD-ROM, DVD, memory stick, magnetic tape, magnetic disk, optical disk or semiconductor storage device. A software program, such as an intent detection program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The Intent detection program 108A (FIG. 1) and software program 114 (FIG. 1) in client computer 102 (FIG. 1), and the Intent detection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the Intent detection program 108A (FIG. 1) and software program 114 (FIG. 1) in client computer 102 (FIG. 1) and the Intent detection program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, RAY drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
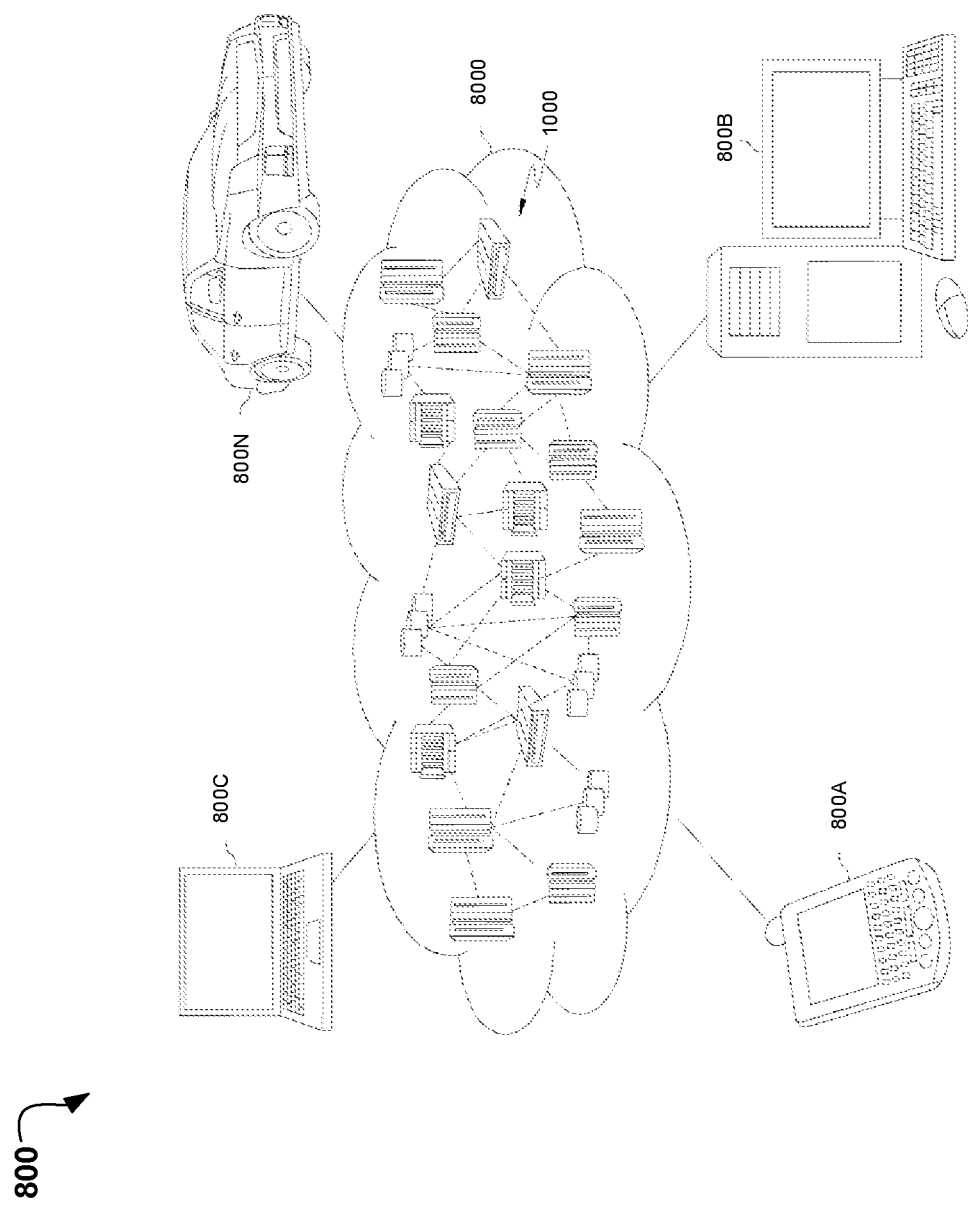
FIG. 5 is a block diagram of an illustrative cloud computing environment including the computer system depicted in FIG. 1, in accordance with an embodiment of the present disclosure.

Referring now to FIG. 5, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud 8000 to offer infrastructure, platforms and/or software as services for which a cloud consumer does not need to maintain resources on a local computing device. It is understood that the types of computing devices 800A-N shown in FIG. 7 are intended to be illustrative only and that computing nodes 100 and cloud 8000 can communicate with any type of computerized device over any type of network and/or network addressable connection (e.g., using a web browser).

Referring now to FIG. 6, a set of functional abstraction layers 900 provided by cloud computing environment 800 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Intent detection 96. An intent detection program 108A, 108B (FIG. 1) may be offered "as a service in the cloud" (i.e., Software as a Service (SaaS)) for applications running on computing devices 102 (FIG. 1) and may automatically detect and process a computer input event comprising one or more intents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically detecting and processing a computer input event comprising one or more intents, comprising:

in response to receiving the computer input event, automatically generating a parse tree comprising one or more nodes with the one or more nodes including a possible interpretation of the received computer input event, wherein the possible interpretation includes at least one determined intent, and wherein automatically generating the parse tree further comprises, in response to identifying language and punctuation within the computer input event to indicate more than one part in the computer input event, using natural language processing to identify a plurality of parts in the computer input event, and based on the identified plurality of parts, generating a first node representing the received computer input event as having a single intent, and generating at least one second node representing the received computer event as having a plurality of intents corresponding to the identified plurality of parts;

performing a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent;

based on the confidence evaluation for the one or more nodes, determining a second score for the respective node associated with the one or more nodes based on the at least one determined intent and the one or more computer agents, wherein determining the second score comprises aggregating the one or more first scores from the one or more computer agents for the respective node; and based on the determined second score, selecting a node associated with the one or more nodes and one or more corresponding computer agents for the selected node for processing the received computer input event.

2. The computer-implemented method of claim 1, further comprising:

receiving the computer input event via an interface, wherein the computer input event comprises at least one of a voice input and keyboard input.

3. The computer-implemented method of claim 1, wherein performing the confidence evaluation further comprises:

sending the first node and the at least one second node to the one or more computer agents;
receiving the one or more first scores from the one or more computer agents for the first node; and
receiving the one or more first scores from the one or more computer agents for the at least one second node.

4. The computer-implemented method of claim 3, wherein receiving the one or more first scores further comprises:

receiving a first score from the respective computer agent based on at least one identified intent associated with the first node and the at least one second node.

5. The computer-implemented method of claim 1, wherein determining the second score by aggregating the one or more first scores from the one or more computer agents further comprises:

combining the first scores for the respective node and calculating at least one of a maximum, a minimum, and an average.

6. The computer-implemented method of claim 1, wherein selecting the node associated with the one or more nodes further comprises:

selecting the node having the second score greater than second scores from other nodes.

7. A computer system for automatically detecting and processing a computer input event comprising one or more intents, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

in response to receiving the computer input event, automatically generating a parse tree comprising one or more nodes with the one or more nodes including a possible interpretation of the received computer input event, wherein the possible interpretation includes at least one determined intent, and wherein automatically generating the parse tree further comprises, in response to identifying language and punctuation within the computer input event to indicate more than one part in the computer input event, using natural language processing to identify a plurality of parts in the computer input event, and based on the identified plurality of parts, generating a first node representing the received computer input event as having a single intent, and generating at least one second node representing the received computer event as having a plurality of intents corresponding to the identified plurality of parts;

performing a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent;

based on the confidence evaluation for the one or more nodes, determining a second score for the respective node associated with the one or more nodes based on the at least one determined intent and the one or more computer agents, wherein determining the second score comprises aggregating the one or more first scores from the one or more computer agents for the respective node; and based on the determined second score, selecting a node associated with the one or more nodes and one or more corresponding computer agents for the selected node for processing the received computer input event.

8. The computer system of claim 7, further comprising:
receiving the computer input event via an interface, wherein the computer input event comprises at least one of a voice input and keyboard input.

9. The computer system of claim 7, wherein performing the confidence evaluation further comprises:
sending the first node and the at least one second node to the one or more computer agents;
receiving the one or more first scores from the one or more computer agents for the first node; and
receiving the one or more first scores from the one or more computer agents for the at least one second node.

10. The computer system of claim 9, wherein receiving the one or more first scores further comprises:
receiving a first score from the respective computer agent based on at least one identified intent associated with the first node and the at least one second node.

11. The computer system of claim 7, wherein determining the second score by aggregating the one or more first scores from the one or more computer agents further comprises:
combining the first scores for the respective node and calculating at least one of a maximum, a minimum, and an average.

12. The computer system of claim 7, wherein selecting the node associated with the one or more nodes further comprises:
selecting the node having the second score greater than second scores from other nodes.

13. A computer program product for automatically detecting and processing a computer input event comprising one or more intents, comprising:
one or more tangible computer-readable storage devices and program instructions stored on at least one of the one or more tangible computer-readable storage devices, the program instructions executable by a processor, the program instructions comprising:
in response to receiving the computer input event, automatically generating a parse tree comprising one or more nodes with the one or more nodes including a possible interpretation of the received computer input event, wherein the possible interpretation includes at least one determined intent, and wherein automatically generating the parse tree further comprises,
in response to identifying language and punctuation within the computer input event to indicate more than one part in the computer input event, using natural language processing to identify a plurality of parts in the computer input event, and
based on the identified plurality of parts, generating a first node representing the received computer input event as having a single intent, and generating at least one second node representing the received computer event as having a plurality of intents corresponding to the identified plurality of parts;

performing a confidence evaluation for the one or more nodes based on the at least one determined intent and based one or more computer agents, wherein performing the confidence evaluation further includes receiving one or more first scores from the one or more computer agents for a respective node associated with the one or more nodes to indicate an ability of a respective computer agent to process the respective node based on the at least one determined intent;

based on the confidence evaluation for the one or more nodes, determining a second score for the respective node associated with the one or more nodes based on the at least one determined intent and the one or more computer agents, wherein determining the second score comprises aggregating the one or more first scores from the one or more computer agents for the respective node; and based on the determined second score, selecting a node associated with the one or more nodes and one or more corresponding computer agents for the selected node for processing the received computer input event.

14. The computer program product of claim 13, wherein performing the confidence evaluation further comprises:
sending the first node and the at least one second node to the one or more computer agents;
receiving the one or more first scores from the one or more computer agents for the first node; and
receiving the one or more first scores from the one or more computer agents for the at least one second node.

15. The computer program product of claim 14, wherein receiving the one or more first scores further comprises:
receiving a first score from the respective computer agent based on at least one identified intent associated with the first node and the at least one second node.

16. The computer program product of claim 13, wherein determining the second score by aggregating the one or more first scores from the one or more computer agents further comprises:
combining the first scores for the respective node and calculating at least one of a maximum, a minimum, and an average.

17. The computer program product of claim 13, wherein selecting the node associated with the one or more nodes further comprises:
selecting the node having the second score greater than second scores from other nodes.

* * * * *